(12) United States Patent
Faruque et al.

(10) Patent No.: US 10,632,963 B2
(45) Date of Patent: *Apr. 28, 2020

(54) LOAD LIMITING SEATBELT RETRACTOR

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/704,635

(22) Filed: Sep. 14, 2017

(65) Prior Publication Data

US 2019/0077366 A1    Mar. 14, 2019

(51) Int. Cl.
*B60R 22/28* (2006.01)
*B60R 22/34* (2006.01)

(52) U.S. Cl.
CPC .......... *B60R 22/28* (2013.01); *B60R 22/3413* (2013.01); *B60R 2022/282* (2013.01); *B60R 2022/288* (2013.01)

(58) Field of Classification Search
CPC ..... B60R 22/28; B60R 22/34; B60R 22/3413; B60R 22/4628; B60R 2022/282; B60R 2022/288
See application file for complete search history.

(56) References Cited

U.S. PATENT DOCUMENTS

| | | | |
|---|---|---|---|
| 6,102,439 A | 8/2000 | Smithson et al. | |
| 6,237,959 B1 | 5/2001 | Hishon | |
| 7,828,331 B2 | 11/2010 | Jessup et al. | |
| 8,262,133 B2 | 9/2012 | Usoro et al. | |
| 2010/0007125 A1* | 1/2010 | Jessup | B60R 22/3413 280/805 |
| 2018/0319363 A1* | 11/2018 | Faruque | B60R 22/405 |

FOREIGN PATENT DOCUMENTS

| | | |
|---|---|---|
| DE | 102009014999 A1 | 9/2010 |
| DE | 102009033690 A1 | 1/2011 |
| WO | 2016025780 A1 | 2/2016 |

* cited by examiner

*Primary Examiner* — Sang K Kim
(74) *Attorney, Agent, or Firm* — Frank A. MacKenzie; Bejin Bieneman PLC

(57) ABSTRACT

A seatbelt retractor includes a spool, a piston, a cylinder, a ring, and a valve. The spool is rotatably connected with a base by the piston and the cylinder. The piston is fixed to one of the base and the spool. The cylinder receives the piston and is fixed to the other of the base and the spool. The piston and the cylinder define a first chamber. The ring is sealed against the cylinder and defines a second chamber connected with the first chamber by an aperture. The valve is disposed across the aperture.

20 Claims, 8 Drawing Sheets

LOAD LIMITING SEATBELT RETRACTOR

BACKGROUND

The seatbelt portion of a vehicle restraint system secures the occupant of a vehicle against harmful movement that may result from a vehicle collision. The seatbelt functions to reduce the likelihood of injury by reducing the force of occupant impacts with vehicle interior structures. In this role the seatbelt applies loads across the chest or lap of the occupant. Controlling or reducing these loads may reduce the risk of occupant injury during a collision. A seatbelt system may include a retractor that incorporates a load limiting device. The retractor includes a spool around which the webbing is wrapped. In the event of a vehicle impact, the spool is locked, preventing its rotation and preventing unwinding of the webbing. A load limiting mechanism within the retractor allows control or reduction of restraint load transmitted to the occupant during a vehicle impact. A known load limiting mechanism includes a torsion bar disposed in a center of the spool. The torsion bar may be a cylindrical bar of steel having a yield strength selected to allow the bar to torsionally yield at a predetermined value limiting the loads transmitted to the occupant, thus reducing risk of injury during a vehicle impact. Twisting of the torsion bar absorbs some of the inertia energy, thereby reducing the load sustained by the occupant against the webbing. The torsion bar, when plastically deformed, may yield in a non-linear manner that may be difficult to duplicate. It is desired to provide an improved load limiting mechanism.

DETAILED DESCRIPTION

Figure 1:
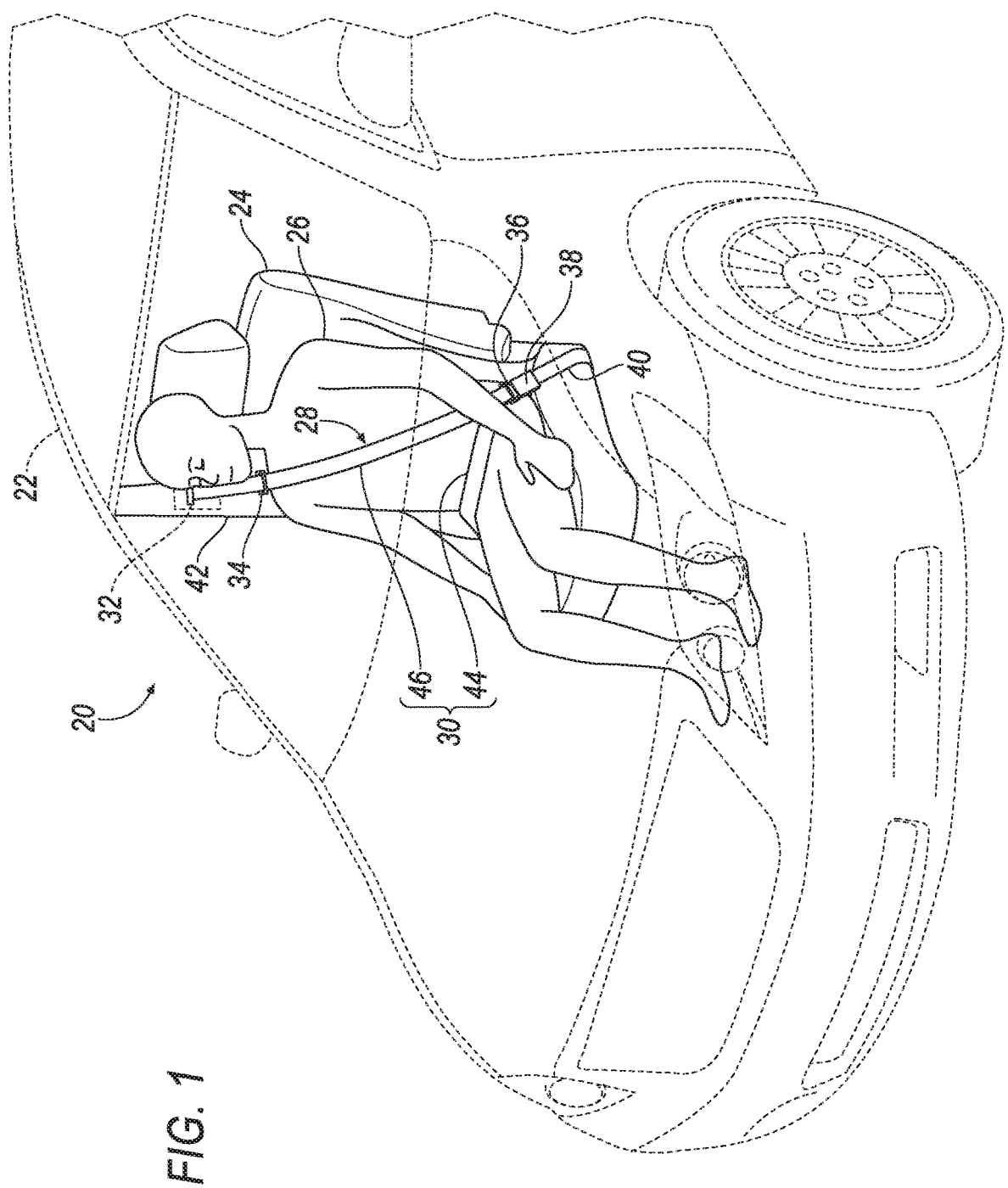
FIG. 1 is a perspective view of a vehicle occupant with an example seatbelt system.
Figure 2:
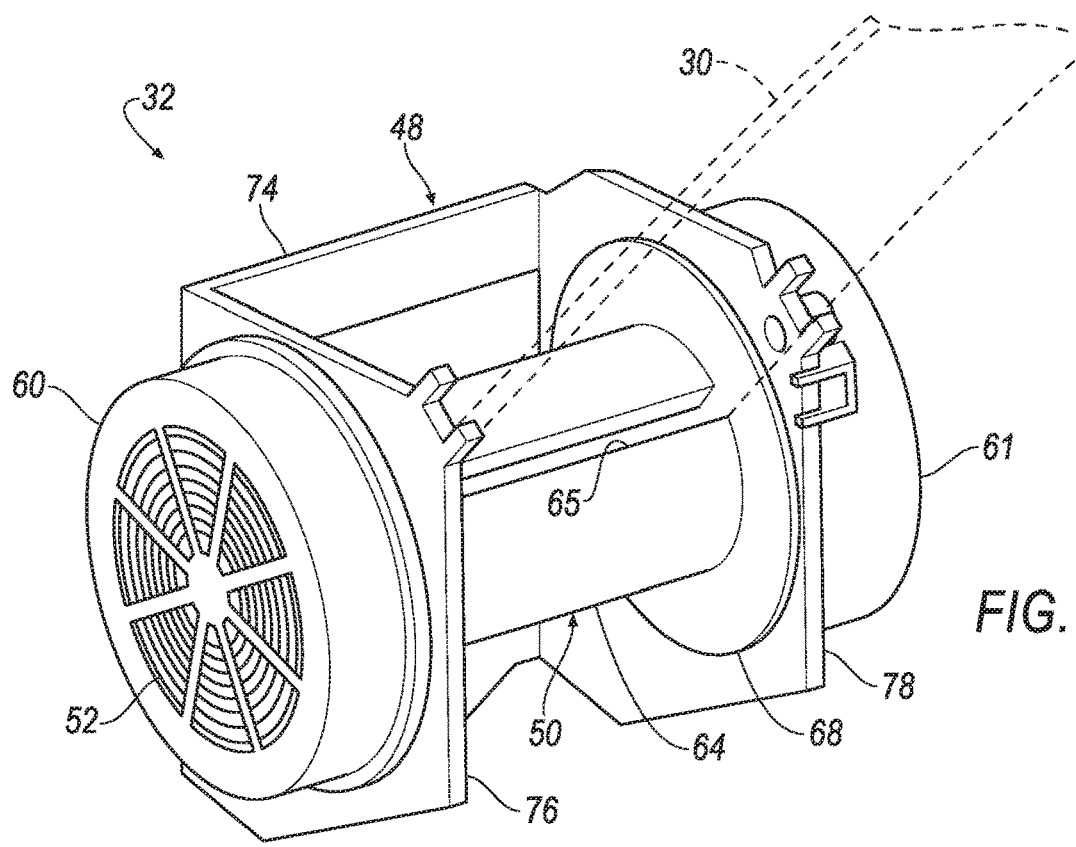
FIG. 2 is a first perspective view of an example retractor.
Figure 3:
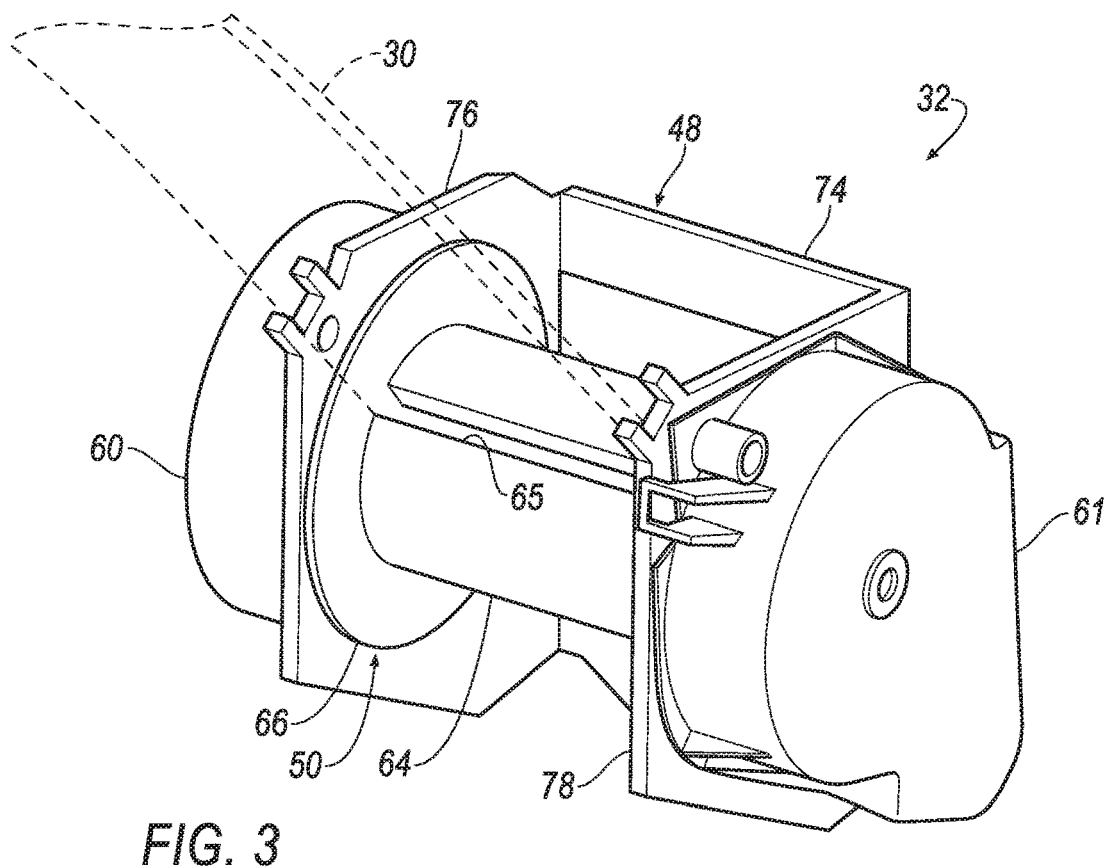
FIG. 3 is a second perspective view of the example retractor of FIG. 2.
Figure 4:
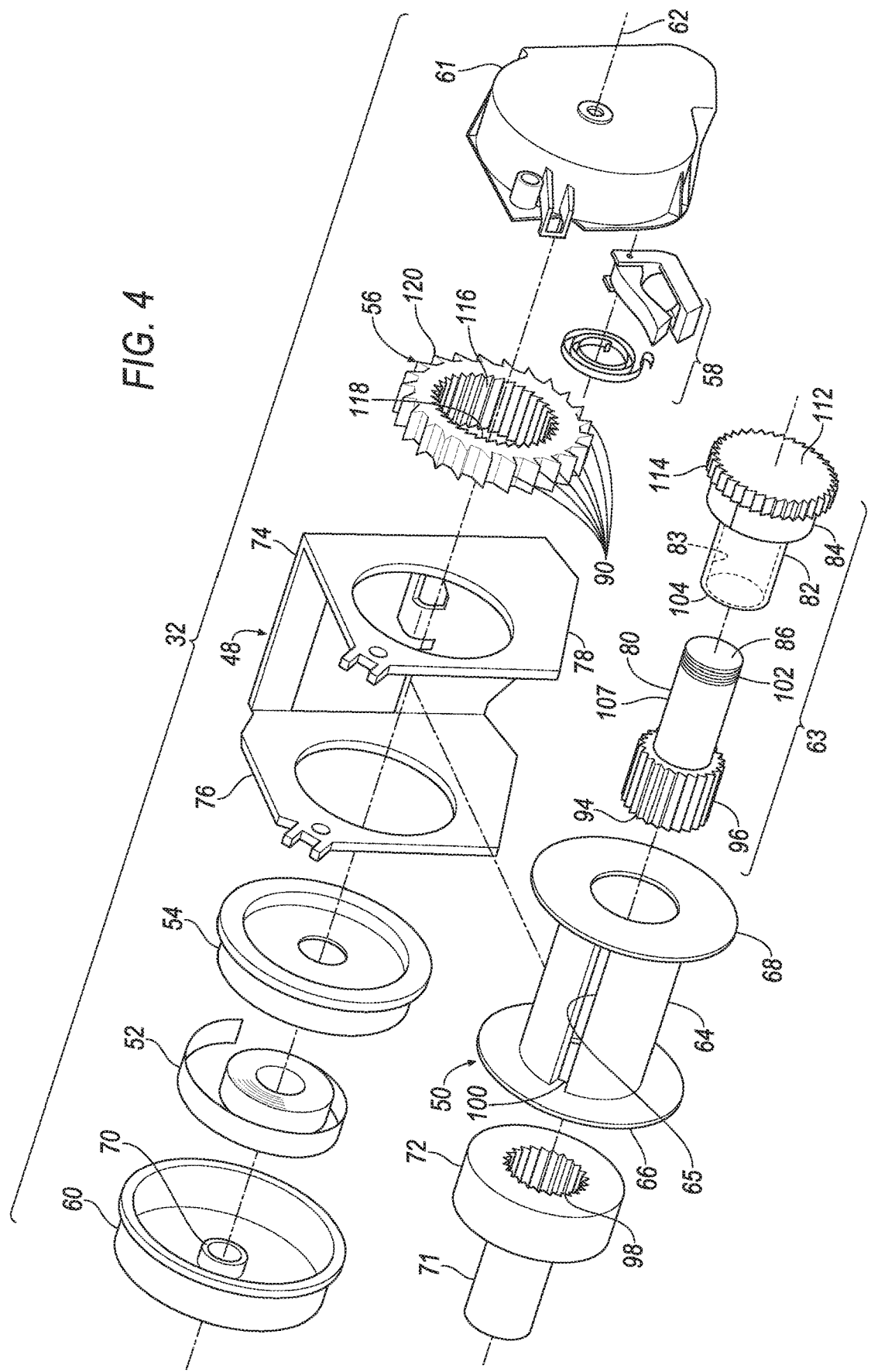
FIG. 4 is an exploded view of the example retractor of FIGS. 2 and 3.
Figure 5:
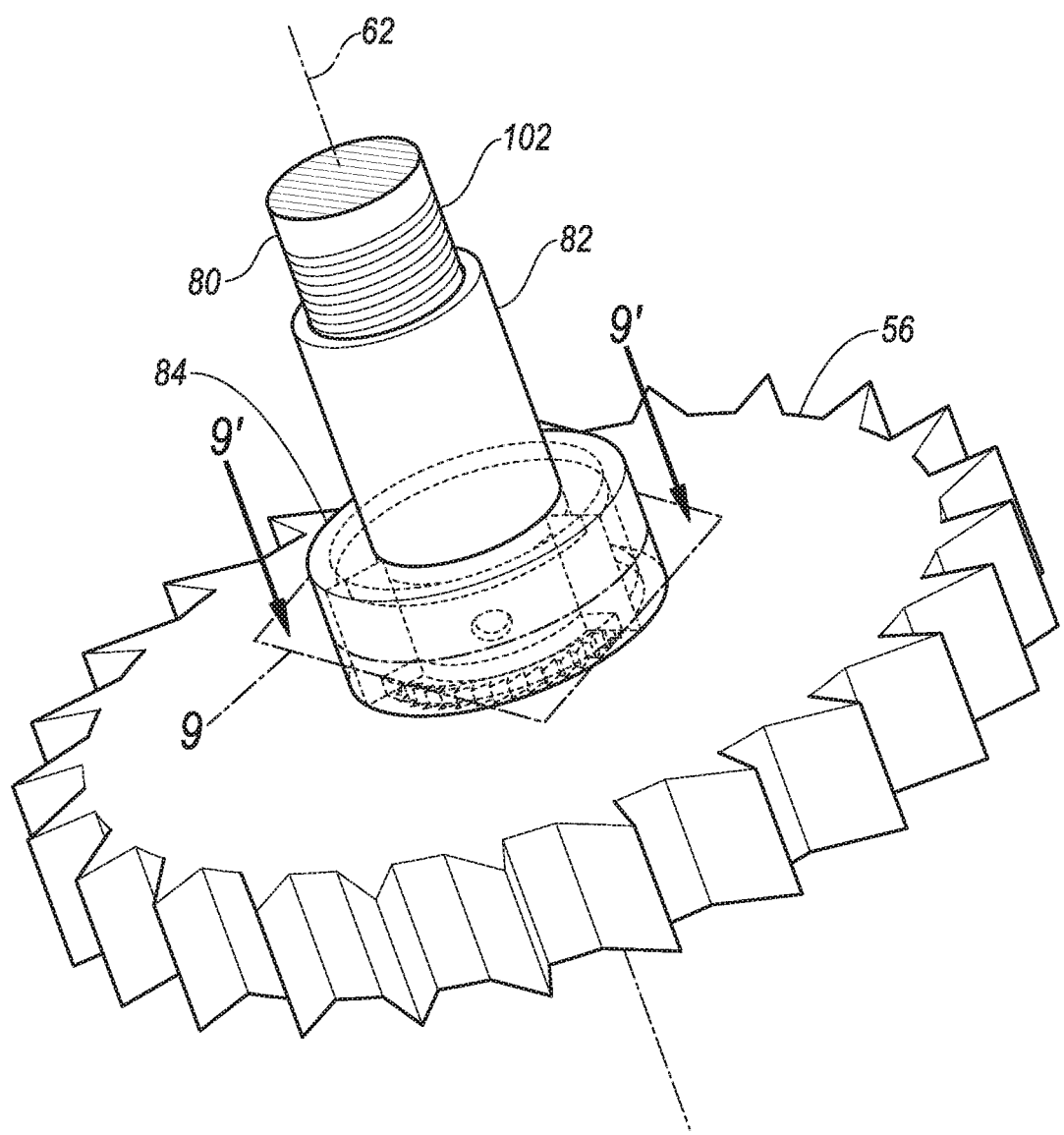
FIG. 5 is an enlarged perspective view of an example energy absorber of the example retractor of FIG. 4.
Figure 6:
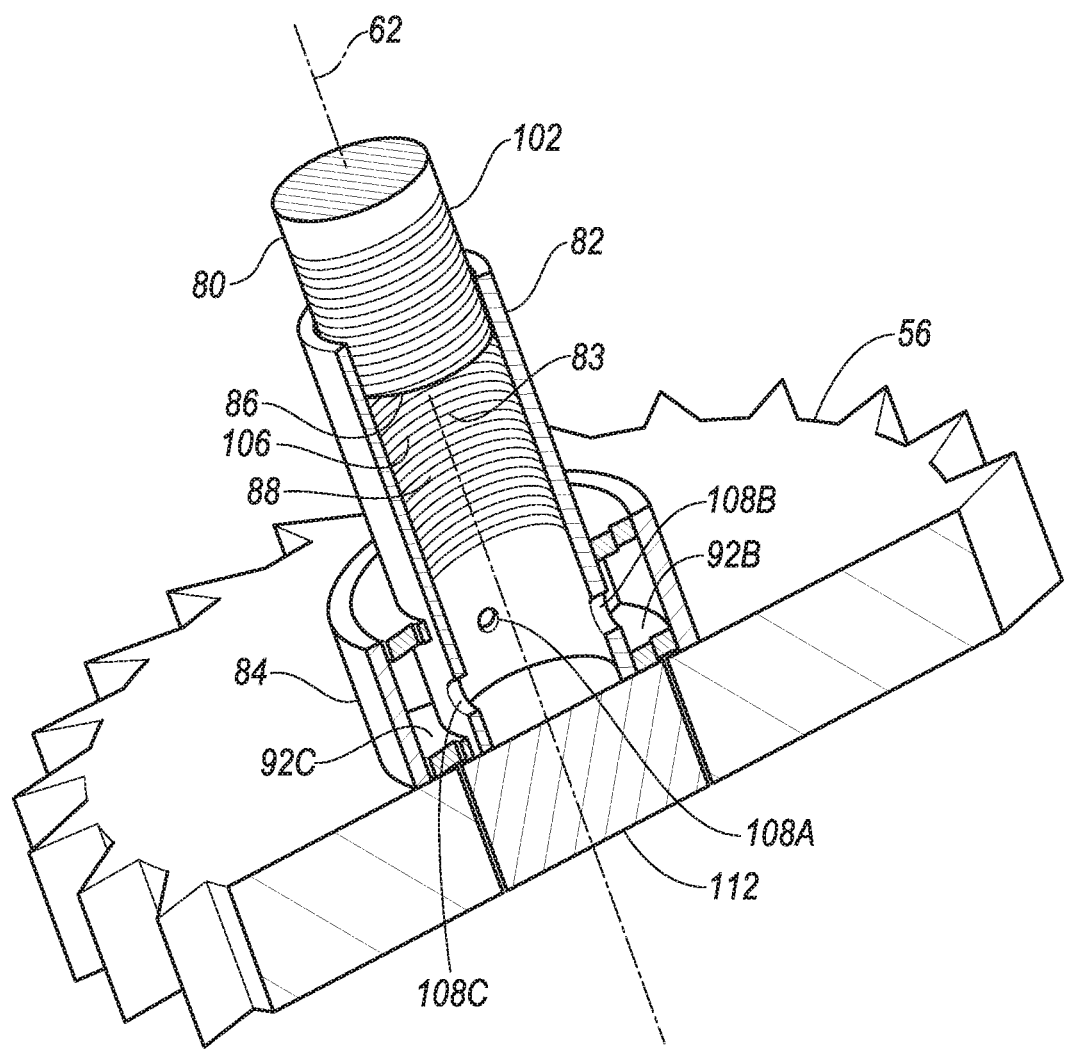
FIG. 6 is a sectioned perspective view of the example energy absorber of FIG. 5 with the section taken through a plane coincident with the axis of rotation.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A seatbelt retractor includes a spool, a piston, a cylinder, a ring, and a valve. The spool is rotatably connected with a base by the piston and the cylinder. The piston is fixed to one of the base and the spool. The cylinder receives the piston and is fixed to the other of the base and the spool. The piston and the cylinder define a first chamber. The ring is sealed against the cylinder and defines a second chamber connected with the first chamber by an aperture. The valve is disposed across the aperture.

The seatbelt retractor may further include a housing and a base lock. The spool may be rotatably coupled to the housing for relative rotation thereto about an axis of rotation defined by the spool. The base lock may be disposed between the base and a housing. The base lock, in a first condition, fixes the base to the housing.

A seatbelt retractor may include a spool, a housing, a base lock, a base and an energy absorber. The spool may be rotatably connected with the base by the energy absorber. The spool may be rotatably coupled to the housing for relative rotation thereto about an axis of rotation defined by the spool. The base lock may be disposed between the base and the housing. The base lock in a first condition may fix the base to the housing. The energy absorber may include a piston, a cylinder, a ring and a valve. The piston may be fixed to one of the base and the spool. The cylinder may receive the piston and may be fixed to the other of the base and the spool. The cylinder, with the piston, define a first chamber. The ring may be sealed against the cylinder and may define a second chamber connected with the first chamber by an aperture. The valve may be disposed across the aperture.

The base lock may further include a plurality of clutching teeth and an engagement tooth. The plurality of clutching teeth may be disposed on an outer circumference of the base for rotation therewith. The engagement tooth may be connected to the housing. The engagement tooth, in the first condition, is in engagement with the clutching teeth. The engagement tooth, in a second condition, is not in engagement with the clutching teeth. Engagement of the engagement tooth with the clutching teeth rotatably fixes the cylinder to the base.

The piston may have piston threads. The cylinder may include a bore receiving the piston. Cylinder threads may be inside the bore. The piston threads and the cylinder threads may be in threaded engagement with each other.

The cylinder may be connected to the base and the piston may be connected to the spool.

The ring may be divided into a plurality of secondary chambers, each with an aperture connecting to the first chamber and a valve disposed across the aperture.

The plurality of secondary chambers may be at least three.

The valves may be rupturable pressure relief valves having a rupture strength corresponding to a predetermined seatbelt tension force.

The valves may be pressure relief valves and may each have a predetermined pressure relief value. The pressure relief value of each may be selected to correspond to an associated predetermined seatbelt tension force. The predetermined seatbelt tension forces are not equal.

A flow area of the apertures and the pressure relief value of the valves associated with the apertures may vary inversely, with the flow area of the apertures decreasing as the pressure relief value of the valves increases.

An end cap may be rotatably fixed to the spool and to an end of the piston. The end cap may be rotatably supported by a spring cover.

An example restraint system 20, as illustrated in FIGS. 1-10, may be disposed in a vehicle 22. The vehicle 22 includes a seat 24 that may support an occupant 26 of the vehicle 22. The seat 24 may be a front seat or a rear seat, and may be in any cross-vehicle position. The seat 24 shown in FIG. 1 is a bucket seat, but alternatively the seat 24 may be a bench seat or another type of seat. The occupant 26 may be an adult or adolescent, or may alternatively be a child car seat for supporting an infant or young child. The position and orientation of the seat 24 and components thereof may be adjustable by the occupant 26.

The restraint system 20 includes an example seatbelt system 28 and may also include an airbag system (not shown). The illustrated seatbelt system 28 is a three-point system. By three-point, it is meant that a seatbelt, i.e., a webbing or a belt, 30 of the system 28 restrains the occupant 26 at three points: at a shoulder, in the example of FIG. 1 the right shoulder, and on both sides of the occupant's lap.

The seatbelt system 28 may include, in addition to the seatbelt 30, a retractor 32, a D-ring 34, a seatbelt latch plate 36, an anchor (not shown), a buckle 38, and a buckle mount 40. The seatbelt system 28 may, alternatively, include another arrangement of attachment points. The seatbelt system 28, when fastened, retains the occupant 26 on the seat 24, e.g., during sudden decelerations of the vehicle 22.

The retractor 32 receives and dispenses a first end of the seatbelt 30. The retractor 32 may be fixed, as illustrated, to the vehicle structure, e.g., to a B-pillar 42, or alternatively, to a frame of the seat 24. An alternative vehicle structure location includes a floor of the vehicle 22.

The D-ring 34 provides a consistent orientation of the seatbelt 30 across the occupant's shoulder, e.g., in a back of the seat 24. The D-ring 34, when included, receives the seatbelt 30 and directs the seatbelt 30 from the retractor 32 across the shoulder of the occupant 26. The D-ring 34 may be fixed to the back of the seat 24, or, alternatively, to a structural component of the vehicle, e.g. a B-pillar 42. When the retractor 32 is mounted to one of the B-pillar 42 and the seat frame, the D-ring 34 may be omitted from the system 28.

The seatbelt latch plate 36, i.e., a clip, selectively engages the buckle 38 on an inboard side of the occupant 26. The latch plate 36 is received by a slot in the buckle. The buckle 38 is fixed to the vehicle structure or to the seat frame by the buckle mount 40.

The seatbelt anchor may be in the form of an anchor plate (not shown) and may be disposed on an outboard side of the seat 24. The plate is fixed to a second end of the seatbelt 30 opposite the retractor 32 and is also fixed to one of the frame of the seat 14 and the structure of the vehicle 12 to thereby fix the second end of the seatbelt 30.

The latch plate 36 slides freely along the seatbelt 30 and, when engaged with the buckle 38, divides the seatbelt 30 into a lap band 44 and a shoulder band 46. The lap band 44 is disposed between the latch plate 36 and the anchor. The shoulder band 46 may be disposed between the latch plate 36 and the D-ring 34.

With reference to the FIGS. 2-10 the example retractor 32 includes a housing 48, a spool 50, a retractor spring 52, a disc 54, a base 56, a base lock 58, a spring cover 60, and a lock cover 61. The spool 50 is rotatably coupled to the housing 48 for relative rotation thereto about an axis of rotation 62 defined by the spool 50. The spool 50 is rotatably connected with, i.e., rotatably fixed for rotation with, the base 56 by an energy absorber 63.

The lock cover 61 is fixed to the housing 48 at the second end of the spool 50 and is disposed over the base 56 and the lock 58. The illustrated lock 58, best shown in FIGS. 7 and 8, may include components fixed to either the housing 48 or the lock cover 61.

The spool 50 may freely rotate relative to the housing 48. The first end of the seatbelt 30 is connected to the spool 50. The spool 50 includes a hub 64 that may be cylindrical in shape and centered on the axis 62. The spool 50 may be adapted to receive the seatbelt 30, for example, by including a webbing attachment slot 65 and permitting the seatbelt 30 to wind around the hub 64 of the spool 50.

The seatbelt 30 may be attached to the spool 50. Specifically, one end of the seatbelt 30 may be attached to the seatbelt anchor, and another end of the seatbelt 30 may be attached to the spool 50, with the seatbelt 30 wound around the spool 50 beginning at that end. The seatbelt 30 may be formed of a fabric in the shape of a strap.

The spool 50 may include a first spool flange 66 at a first end of the hub 64 and a second spool flange 68 at a second end of the hub 64. The flanges 66, 68 may provide a border for the seatbelt 30, helping to maintain the layers or wraps of the seatbelt over the hub 64 in alignment with each other.

The retractor spring 52 rotatably biases the spool 50 relative to the housing 48. The retractor spring 52, as noted above, may extend from the housing 48 to the spool 50 either directly or indirectly, e.g., through the disc 54 and the cover 60. The retractor spring 52 may be loaded in tension or compression when the seatbelt 30 is fully retracted, and the retractor spring 52 may be further loaded in either tension or compression when the seatbelt 30 is extended from the spool 50. Thus, the retractor spring 52 may exert a force tending to retract the seatbelt 30. The retractor spring 52 may be a spiral torsion spring or any other suitable type of spring. The spring cover 60 is fixed to the housing 48 at a first end of the spool 50, provided by the first spool flange 66, and is disposed over the disc 54 and the spring 52. The spring cover 60 may include a support sleeve 70 that receives a spindle portion 71 of an end cap 72 for rotatable support of the spool 50. The end cap 72 may be fixed to the spool 50 in any appropriate manner to ensure unitary movement therewith, e.g., by welding.

The housing 48 may be formed of stamped sheet steel or other suitably rigid material, e.g., plastic. The housing 48 may include a center portion 74 connecting a first wing 76 and a second wing 78. The first wing 76 and the second wing 78 are on opposite sides of the center portion 74 and face each other. The wings 76, 78 receive the spool 50, with the flanges 66, 68 being disposed between the wings 76, 78. The housing 48 may be mounted to a structural element of the vehicle 22, e.g., to the B pillar 42 in the instance the seat 24 is a front seat, to a C pillar (not shown) when the seat 24 is a rear seat, or may be mounted to the seat 24.

The energy absorber 63 includes a piston 80, a cylinder 82 and a ring 84. The piston 80 is fixed to one of the base 56 and the spool 50. The example illustrated piston 80 is fixed to the spool 50 via the endcap 72 as described in more detail below. The cylinder 82 is fixed to the other of the base 56 and the spool 50. The example illustrated cylinder 82 is fixed to the base 56 as described in more detail below.

The cylinder 82 has a threaded bore 83 that threadingly receives the piston 80. The cylinder 82, together with the piston 80, and more particularly a closed first end 86 of the piston 80, define a first chamber 88 within the bore 83 of the cylinder 82. A substantially incompressible liquid 90 is disposed in the first chamber 88. The liquid 90 may fill the chamber 88. Rotation between the piston 80 and the cylinder 82, with the threaded engagement therebetween, displaces the piston 80 into the cylinder 82, compressing the liquid 90 therein.

The ring 84 circumscribes and is fixed to the cylinder 82. The ring 84 defines a second chamber 92, represented collectively by reference numbers 92A, 92B and 92C, with respect to the cylinder 82. The structure of the energy absorber 63 and its operation is described in more detail below.

The spool 50 is, as noted above, rotatably coupled to the housing 48 for relative rotation thereto. The piston 80 is fixed on a second end 94 to the end cap 72 for rotation therewith. The end cap 72 may be rotatively fixed to the second end 94 by axially oriented outer splines 96 on the second end 94 that may be received by complementary inner splines 98 formed inside of the end cap 72.

The first spool flange 66 may include a flange aperture 100 having splines (not shown) complementary to the outer splines 96, facilitating the unitary rotation of the spool 50, the end cap 72, and the piston 80. The example disc 54 may be fixed to the first spool flange 66 for rotation with the spool 50.

The first end 86 of the piston 80 has threads 102, i.e., piston threads, thereon. The second end 94 is threaded into a first end 104 of the cylinder 82 which has receiving threads 106, i.e., cylinder threads, inside the threaded bore 83 that are complementary to the threads 102. The piston threads 102 are in threaded engagement with the cylinder threads 106. A shank 107 of the piston 80 between the threads 102 and the second end 94 may have an outside diameter equal to or less than a minor diameter of the threads 102 to allow the piston 80 to thread into the cylinder bore 83 to a depth greater than the threads 102. Alternatively, the threads 102 may extend an entire length of the piston 80 or to the outer splines 96.

A flow control aperture 108, generic to each of flow control apertures 108A, 108B and 108C and represented in the figures thereby, may pass through a wall 109 of the cylinder 82, connecting the first chamber 88 and the second chamber 92. A rupturable pressure relief valve 110, generic to each of rupturable pressure relief valves 110A, 110B, and 110 C and represented in the figures by the reference numbers 110A, 110B and 110C, is disposed across the flow control aperture 108, blocking the liquid 90 from moving from the first chamber 88 to the second chamber 92.

The rupturable valve 110 has a rupture strength of a first predetermined pressure P1, corresponding to F1 for a given piston area and an associated predetermined seatbelt tension force. The exact nature of the valve may be varied. An example valve is illustrated in U.S. Pat. No. 3,007,773. The valve 110 may alternatively be in the form of a membrane configured to rupture at a predetermined pressure.

When the valve 110 ruptures, the liquid 90 may flow from the first chamber 88 into the second chamber 92. A rate of flow of the liquid 90 from the first chamber 88 to the second chamber 92 corresponding to an axial speed of the piston 80 within the chamber 88, and to the rate of displacement of the seatbelt 30 from the spool 50. A size, i.e., a flow area, of the aperture 108 may affect a pressure of the liquid 90 within the first chamber 88 as the piston 80 is being driven against it, controlling a resistance to displacement of the piston 80 within the bore 83. Thus, the reactive force of the liquid 90 against the piston 80 varies with the displacement rate of the piston 80 and the size, i.e., flow area, of the flow control aperture 108. The reactive force may be tuned to achieve a desired cushioning of the seatbelt 30 against the occupant 26. Tuning of a maximum force and a desired rate of force increase may be achieved by varying system parameter including a thread pitch and the flow control aperture 108 size as to achieve a desired seatbelt reaction force.

The second chamber 92 may include a plurality of second, i.e., secondary, chambers, e.g., first secondary chamber 92A, second secondary chamber 92B and third secondary chamber 92C distributed radially about and extending from the cylinder 82. Three blocking walls 111A, 111B and 111C may be used to separate the secondary chambers 92A, 92B and 92C. The walls 111A, 111B and 111C may be disposed within and constitute part of the ring 84. The walls are sealed against an inside surface of the ring 84 and against the cylinder 82.

Each of the secondary chambers 92A, 92B and 92C may be connected to the first chamber 88 by a distinctively sized first, second and third flow control apertures 108A, 108B and 108C passing through the cylinder wall 109. Each of the apertures 108A, 108B and 108C may have a unique size, i.e., flow area.

The apertures 108A, 108B and 108C may respectively be covered by first, second and third valves 110A, 110B and 110C respectively, each having a unique predetermined pressure relief value, corresponding to a belt tension, selected for use with the associated secondary chamber 92A, 92B, 92C.

Providing the three secondary chambers 92A, 92B and 92C with distinctive aperture sizing and distinctive valve rupture values allows for a stair-step increase in loading responsive to a seatbelt force when the spool is locked, as described in more detail below. Additionally, for alternative tuning demands, all three flow control apertures 108A, 108B and 108C may connect to a single common second chamber 92 as may be provided by the ring 84 without walls 111A, 111B and 111C. The second end 94 may also form a side of the ring 84.

The base 56 may be in the form of a disc. The cylinder 82 is fixed on a second end 112 to the base 56 for rotation therewith. The second end 112 may be rotatively fixed to the base 56 by axially oriented outer splines 114 on the second end 112 that may be received by complementary inner splines 116 formed inside of an aperture 118 in the base 56.

The base lock 58 may be any mechanism suited to preventing or restricting rotation of the base 56 or the spool 50 relative to the housing 48. Such mechanisms as lock 58 are known and are commercially available from companies including Autoliv Inc. and Z F Friedrichshafen AG. One type of base lock may engage the cylinder 82 with the housing 48 responsive to a rapid movement of the webbing 30 and an associated rapid spinning of the spool 50. Another type of base lock, consistent with the illustrated base lock 58, may engage the base 56 with the housing 48 responsive to a sudden deceleration or rearward acceleration of the vehicle 22. It is also known to incorporate both types of mechanisms into a single retractor 32. The example base lock 58 is just one approach to engaging the base 56 with the housing 48. The example base lock 58 includes axially extending clutching teeth 120 disposed around an outer circumference of the base 56 and an example base lock 58 that engages the clutching teeth 120 under predetermined conditions.

The base lock 58 may include a pivot arm 124 pivotable relative to a ball retainer 126. The ball retainer 126 includes a first ball track 128, and is fixed relative to the housing 48. The pivot arm 124 includes a second ball track 130 facing the first ball track 128. The pivot arm 124 also includes an engagement tooth 132 on a side opposite the second ball track 130. Via the pivot arm 124, the tooth 132 is connected with the housing 48. In an installed position, the tracks 128, 130 are parallel with a forward direction of motion of the vehicle 22. A ball 134, e.g., a steel ball, is disposed in the tracks 128, 130. A hinge 136, allowing pivotable movement of the pivot arm 124 relative to the ball retainer 126, is at a rear of the tracks 128, 130.

Figure 7:
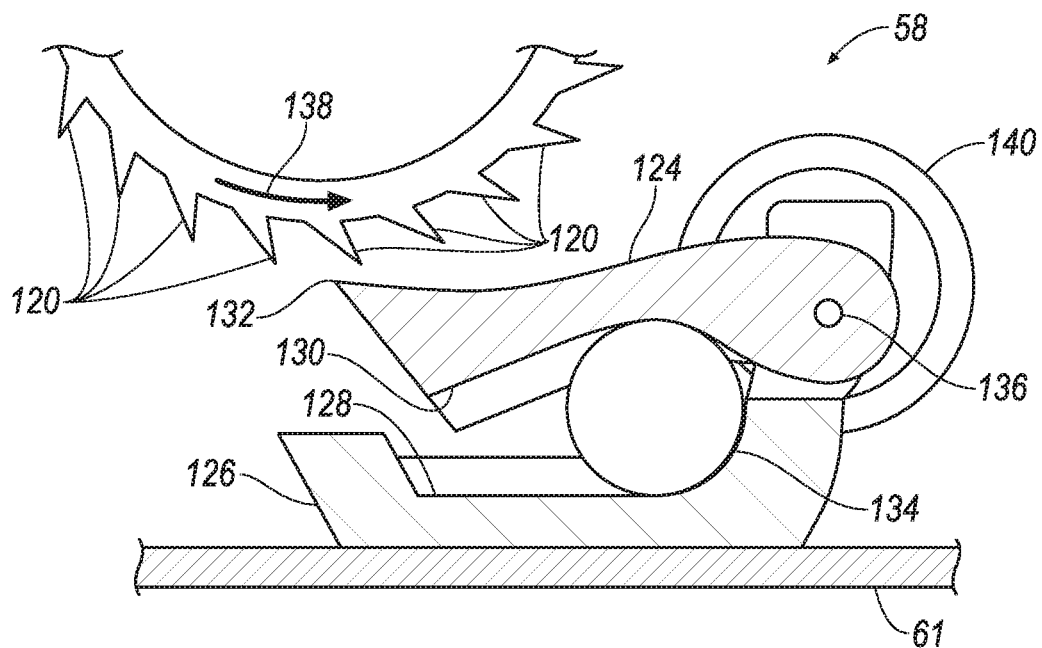
FIG. 7 is a sectional side view of an engagement mechanism in a non-impact condition.

In a first position, the tooth 132 and the pivot arm 124 are pivoted downwardly, ensuring that there is no engagement between the tooth 132 and the clutching teeth 120. Also in the first position, associated with the ball 134 being in a rearward position on the tracks 128, 130, as illustrated in FIG. 7, a distance between forward ends of the tracks 128, 130 is less than a diameter of the ball 134. An unwinding direction of rotation of the spool 50 is indicated by an arrow 138. Rotation of the spool 50 in the direction of arrow 138 results in the webbing 30 unwrapping from the spool 50, and being dispensed from the retractor 32.

Figure 8:
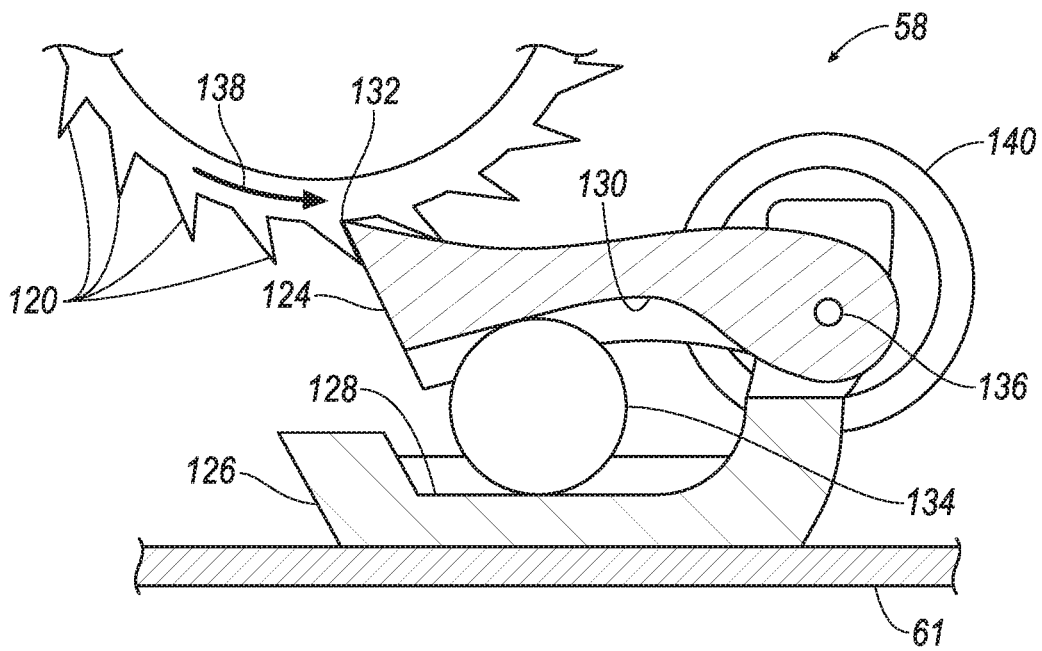
FIG. 8 is a sectional side view of the engagement mechanism of FIG. 7 in an impact condition.
Figure 9A:
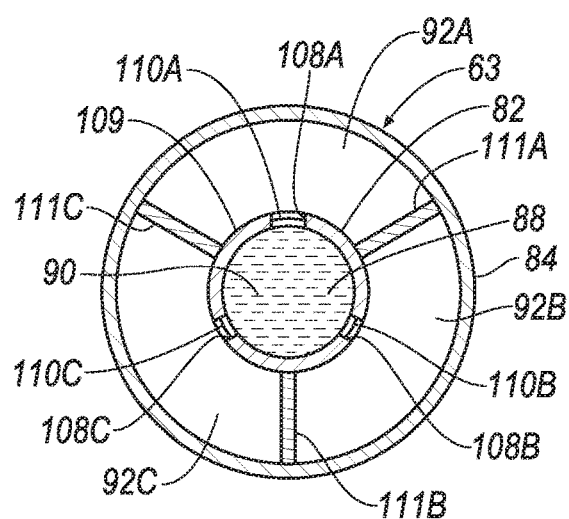
FIG. 9A is a sectional downward view, through an imaginary cutting plane 9 in the direction of arrows 9', of the energy absorber of FIG. 5 in a first condition.
Figure 9B:
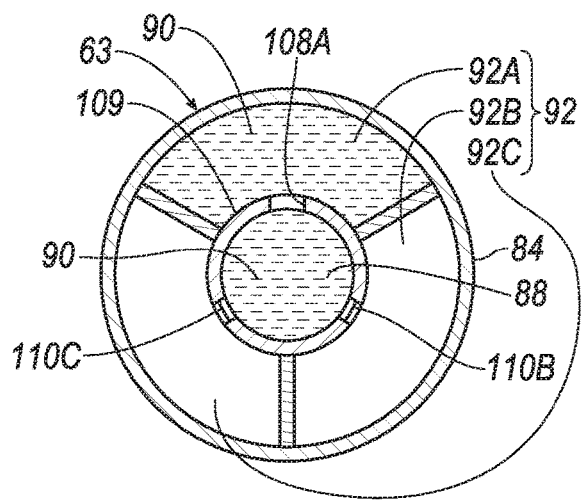
FIG. 9B is a sectional downward view of the energy absorber of FIG. 9A in a second condition.
Figure 9C:
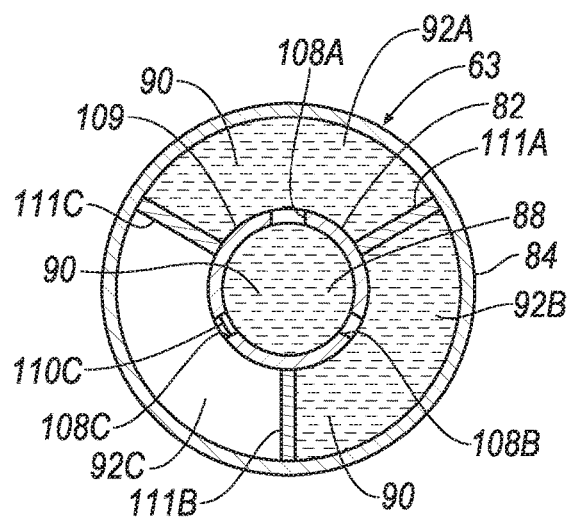
FIG. 9C is a sectional downward view of the energy absorber of FIG. 9A in a third condition.
Figure 9D:
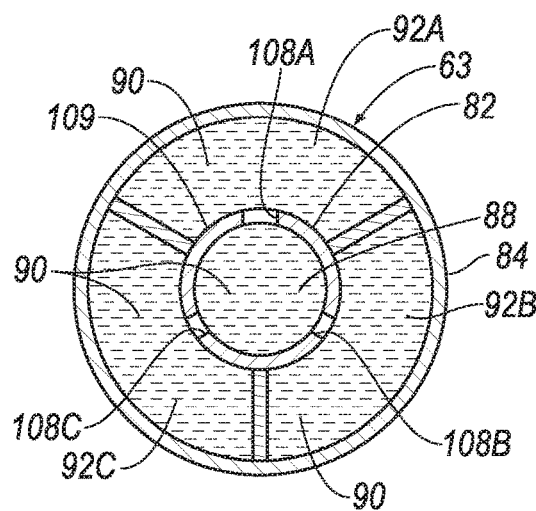
FIG. 9D is a sectional downward view of the energy absorber of FIG. 9A in a fourth condition.

In a second position, the tooth 132 and pivot arm 124 are pivoted upwardly, toward the base 56 and the tooth 132 into engagement with the clutching teeth 120. In the second position, associated with the ball 134 being in a forward position on the tracks 128, 130, as illustrated in FIG. 8, a distance between forward ends of the tracks 128, 130 is greater than the distance of the first position.

A pivot spring 140 may be disposed between the pivot arm 124 and the ball retainer 126 to bias the pivot arm 124 toward a disengaged position, i.e., an unlocked condition. The biasing of the pivot arm 124 downward may also bias the ball 134 to the disengaged position.

The second ball track 130 has a first portion in a first position relatively proximate to the hinge 136. With the base lock 58 in a locked condition, i.e., with the engagement tooth 132 of pivot arm 124 engaging the clutching teeth 120, the base 56 is fixed relative to the housing 48.

The seatbelt retractor 32 operates as described below and as illustrated in FIG. 10 and FIGS. 9A-9D. FIGS. 9A-9D are sections taken through an intersection of the energy absorber 63 with an imaginary plane 9 in the direction of arrows 9'.

Figure 10:
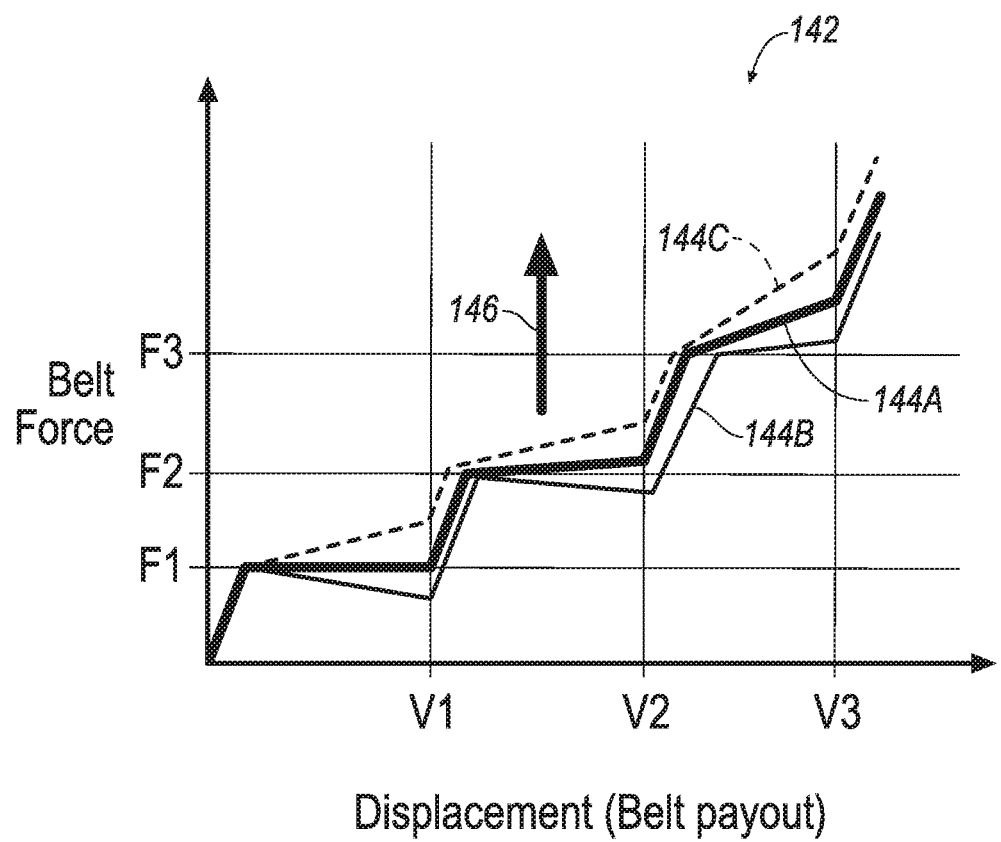
FIG. 10 is a plot of force versus displacement of the energy absorber of FIGS. 2-12.

FIG. 10 is a graph 142 of a curve 144A describing an example relationship between a displacement of the seatbelt 30 from the spool 50 in the unwinding direction 138 and a seatbelt force resisted by the energy absorber 63. The horizontal axis is labeled "Displacement (Belt payout)", but may alternatively be labeled "spool rotations" or "piston displacement" as there is a substantially linear relationship between all three values. The vertical axis is labeled "Belt Force", but may alternatively be labeled "spool torque" or "piston pressure", as there is a substantially linear relationship between all three values.

In the event of a frontal impact, the occupant 26 of the front seat 24 has forward momentum relative to the rest of the vehicle 22. Likewise, the ball 134 of the base lock 58 has forward momentum relative to the ball retainer 126 and the pivot arm 124. An associated forward motion of the ball 134 along tracks 128, 130 pivotably displaces pivot arm 124 against the torque of pivot spring 140 and away from retainer 126. The pivoting of pivot arm 124 brings engagement tooth 132 into engagement with the clutching teeth 120 of the base 56, preventing further rotation of the cylinder 82 relative to the housing 48.

The forward inertial motion of the occupant 26, and particularly of the upper torso of the occupant 26, may act against the webbing 30. With rotation of the base 56 prevented by engagement of the tooth 132 with teeth 120, an inertial force of the occupant against the webbing 30, and particularly the shoulder band 46, is resisted by the spool 50 of the retractor 32.

Consistent with the embodiment of FIGS. 2-9D, preventing rotation of the base 56 does not immediately prevent rotation of the spool 50 and further dispensing of the webbing 30 from the retractor 32 when the spool 50 is resisting a predetermined magnitude of passenger inertia. Rotation of the spool 50 when the base 56 is locked rotates the piston 80 relative to the cylinder 82, threading the piston 80 deeper into the cylinder 82.

The graph 142 is consistent with the description of the operation of the system 20 and its associated curves 144A, 144B and 144C. The stair-step appearance of a baseline curve 144A associated with a first speed, i.e., velocity of the piston 80 in the axial direction, is explained by a sequential transfer of liquid 90 from the first chamber 88 to the secondary chambers 92A, 92B, 92C. Each secondary chamber 92A, 92B, 92C is connected to the first chamber 88 by is associated aperture 108A, 108B and 108C, with flow initially being restricted by valves 110A, 110B, 110C. Each of the secondary chambers 92A, 92B, 92C has a limited volume, e.g., one third of the available volume of liquid 90 in the unstressed first chamber 88, and each aperture 108A, 108B and 108C is sealed with its associated rupturable valve 110A, 110B, 110C respectively.

The valves 110A, 110B, 110C are configured, i.e., formed of a selected material to a predetermined shape, to rupture at progressively higher pressures/piston forces. For example, the valve 110A for the first secondary chamber 92A may be designed to rupture at a first predetermined seatbelt tension force of F1, the valve 110B of the second secondary chamber 92B at a second predetermined seatbelt tension force F2, and the valve 110C of the third secondary chamber 92C at a third predetermined seatbelt tension force F3, with F3>F2>F1. For example, F3 may equal three times the value of F1, and F2 may equal two times the value of F1.

Following the example first or baseline curve 144A, the seatbelt tension, i.e. belt force, associated with the pressure within the first chamber 88, increases from a starting point of zero with an initial displacement from a starting point, i.e., zero, for the seatbelt 30 and the piston 80. The initial steep increase in force with very little increase in displacement is due to compression of the liquid 90 in the first chamber 88 prior to rupture, i.e., opening, of the first valve 110A at F1. The slope is substantially a function of a modulus of elasticity of the liquid 90. The belt force, at a first rate of piston displacement, substantially plateaus at a value of F1, as the liquid 90 flows past the ruptured valve 110A (not illustrated in a ruptured condition), through the first flow control aperture 108A, and into the first secondary chamber 92A.

When the first secondary chamber 92A is filled at V1, the belt force again increases rapidly until the second valve 110B ruptures at belt force F2. The second flow control aperture 108B to the second secondary chamber 92B is more restrictive than the first flow control aperture 108A connecting the second secondary chamber 92B with the first chamber 88, yielding a slope of the force as a function of the displacement coinciding with the liquid 90 entering the second secondary chamber 92B, greater than the slope associated with the liquid 90 entering the first secondary chamber 92A. As such, a flow area of aperture 108A may be greater than a flow area of aperture 108B.

When the second secondary chamber 92B is filled, at line V2, the force resumes its rapid ascent, with the liquid 90 in the first chamber 88 being further compressed until the valve 110C across the aperture 108C for the third secondary chamber 92C ruptures. As the aperture 108C to the third secondary chamber 92C is more restrictive than the aperture 108B to the second secondary chamber 92B, the slope of the belt force as a function of belt displacement, associated with the entry of the liquid 90 into the third secondary chamber 92C, is steeper than the slope associated with the liquid 90 entering the second secondary chamber 92B. As such, a flow area of aperture 108B may be greater than a flow area of aperture 108C. Once the third secondary chamber 92C is full, the slope increases rapidly, as the liquid 90 remaining in the bottom of the first chamber 88 has nowhere else to go.

For systems 20 employing a plurality of secondary chambers 92, the flow area of the apertures 108 and the pressure relief value of the valves 110 associated with the apertures 108 may vary inversely, with the flow area of the apertures 108 decreasing as the pressure relief value of the valves 110 increases.

Arrow 146 indicates a direction of increasing piston speed. A second curve 144B, below the baseline curve 144A, representing a first or baseline piston speed, i.e., belt speed, illustrates an example force-displacement relationship for a slower piston/belt speed. Curve 144C, above the baseline curve 144A, illustrates an example force-displacement relationship for a faster piston/belt speed than that associated with the baseline curve 144A. The force-displacement relationship varies with the speed of the displacement when the liquid 90 is being displaced through the apertures 108A, 108B, 108C. The rupture forces will not be significantly affected by the speed of the piston 80 or belt 30, and the force-displacement ratio when the liquid 90 is being compressed, but not displaced through the apertures 108A, 108B, 108C, will not be affected by the speed of the piston 80.

The additional webbing 30 dispensed by the retractor 32 from the spool 50 may be that corresponding to substantially two revolutions of the spool 50 after engagement of the tooth 132 with the teeth 120, e.g., approximately 8-10 inches.

The magnitude of available rotation, and thus an amount of webbing 30 payed out, may be controlled by factors including an inertia energy of the occupant 26 being restrained, a pitch of the threads 102, 106 and an available amount of piston 80 to base 56 travel. Piston 80 to base 56 travel may in turn be affected by additional factors including: a depth of the bore 83, and the geometric characteristics of the ring 84 determining the available volumes of the secondary chambers 92A, 92B and 92 C.

A substantial termination of spool 50 rotation occurs when a torque resulting from the seatbelt force is exceeded by a torque needed by the ring 84 to displace additional liquid 90 into the secondary chambers 92A, 92B, 92C from the first chamber 88. Some of the occupant's forward inertia energy is absorbed by displacement of liquid 90, thus reducing the force imparted by the webbing 30 against the occupant 26 when the webbing 30 stops during an incident such as a frontal impact.

After an impact in which the valves 110A, 110B, 110C of the energy absorber are ruptured, the retractor 32 may be replaced with a replacement retractor 32.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt retractor comprising:
   a spool rotatably connected with a base by a piston and a cylinder;
   the piston fixed to one of the base and the spool;
   the cylinder receiving the piston, fixed to the other of the base and the spool, defining a first chamber; and
   a ring sealed against the cylinder and defining a second chamber connected with the first chamber by an aperture; and
   a valve disposed across the aperture.

2. The seatbelt retractor of claim 1, further comprising:
   a housing with the spool rotatably coupled thereto for relative rotation of the spool thereto about an axis of rotation defined by the spool; and
   a base lock disposed between the base and the housing, the base lock in a first condition fixing the base to the housing.

3. The seatbelt retractor of claim 2, the base lock further comprising:
   a plurality of clutching teeth disposed on an outer circumference of the base for rotation therewith; and
   an engagement tooth connected to the housing, the engagement tooth in the first condition being in engagement with the clutching teeth and the engagement tooth in a second condition being not in engagement with the clutching teeth,
   wherein engagement of the engagement tooth with the clutching teeth rotatably fixes the cylinder to the base.

4. The seatbelt retractor of claim 1, wherein the piston has piston threads and the cylinder includes a bore receiving the piston and cylinder threads are inside the bore and the piston threads and the cylinder threads are in threaded engagement with each other.

5. The seatbelt retractor of claim 1, wherein the cylinder is connected to the base and the piston is connected to the spool.

6. The seatbelt retractor of claim 1, wherein the ring is divided into a plurality of secondary chambers, each with an aperture connecting to the first chamber and a valve disposed across the aperture.

7. The seatbelt retractor of claim 6, wherein the plurality of secondary chambers is at least three.

8. The seatbelt retractor of claim 6, wherein the valves are rupturable pressure relief valves having a rupture strength corresponding to a predetermined seatbelt tension force.

9. The seatbelt retractor of claim 6, wherein the valves are pressure relief valves and each has a predetermined pressure relief value with its pressure relief value selected to correspond to an associated predetermined seatbelt tension force, and the predetermined seatbelt tension forces are not equal.

10. The seatbelt retractor of claim 9, wherein a flow area of the apertures and the pressure relief value of the valves associated with the apertures vary inversely, with the flow area of the apertures decreasing as the pressure relief value of the valves increases.

11. A seatbelt retractor comprising:
    a spool rotatably connected with a base by an energy absorber;
    a housing with the spool rotatably coupled thereto for relative rotation of the spool thereto about an axis of rotation defined by the spool;

a base lock disposed between the base and the housing, the base lock in a first condition fixing the base to the housing; and the energy absorber including:
- a piston fixed to one of the base and the spool,
- a cylinder receiving the piston and fixed to the other of the base and the spool and defining a first chamber, and
- a ring sealed against the cylinder and defining a second chamber connected with the first chamber by an aperture; and
- a valve disposed across the aperture.

12. The seatbelt retractor of claim 11, wherein the base lock includes:
- a plurality of clutching teeth disposed on an outer circumference of the base for rotation therewith; and
- an engagement tooth connected to the housing, the engagement tooth in the first condition being in engagement with the clutching teeth and the engagement tooth in a second condition being not in engagement with the clutching teeth,
- wherein engagement of the engagement tooth with the clutching teeth rotatably fixes the cylinder to the base.

13. The seatbelt retractor of claim 11, wherein the piston has piston threads and the cylinder includes a bore receiving the piston and cylinder threads are inside the bore and the piston threads and the cylinder threads are in threaded engagement with each other.

14. The seatbelt retractor of claim 11, wherein the ring is divided into a plurality of secondary chambers, each with an aperture connecting to the first chamber and a valve disposed across the aperture.

15. The seatbelt retractor of claim 14, wherein the plurality of secondary chambers is at least three.

16. The seatbelt retractor of claim 14, wherein the valves are rupturable pressure relief valves having a rupture strength corresponding to a predetermined seatbelt tension force.

17. The seatbelt retractor of claim 14, wherein the valves are pressure relief valves and each has a predetermined pressure relief value with its pressure relief value selected to correspond to an associated predetermined seatbelt tension force, and the predetermined seatbelt tension forces are not equal.

18. The seatbelt retractor of claim 17, wherein a flow area of the apertures and the pressure relief value of the valves associated with the apertures vary inversely, with the flow area of the apertures decreasing as the pressure relief value of the valves increases.

19. The seatbelt retractor of claim 11, wherein the cylinder is connected to the base and the piston is connected to the spool.

20. The seatbelt retractor of claim 19, wherein an end cap is rotatably fixed to the spool and to an end of the piston, and the end cap is rotatably supported by a spring cover.

* * * * *